United States Patent
Miyamoto

[11] Patent Number: 6,128,142
[45] Date of Patent: *Oct. 3, 2000

[54] LENS BARREL

[75] Inventor: Hidenori Miyamoto, Urayasu, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/705,061

[22] Filed: Aug. 29, 1996

Related U.S. Application Data

[63] Continuation of application No. 08/475,336, Jun. 7, 1995, abandoned, which is a continuation of application No. 08/222,361, Apr. 4, 1994, abandoned, which is a continuation of application No. 08/021,012, Feb. 22, 1993, abandoned.

[30] Foreign Application Priority Data

Feb. 27, 1992 [JP] Japan ................................. 4-075605

[51] Int. Cl.$^7$ ................................. G02B 15/14
[52] U.S. Cl. ................................. 359/700; 359/704
[58] Field of Search ................................. 359/699, 700, 359/701, 702, 704, 821, 826, 823; 264/1.1, 2.3, 138; 396/75, 85

[56] References Cited

U.S. PATENT DOCUMENTS

| | | | |
|---|---|---|---|
| 3,610,733 | 10/1971 | Back | 359/700 |
| 3,817,601 | 6/1974 | Colaiace et al. | 359/700 |
| 4,707,083 | 11/1987 | Iizuka et al. | 359/700 |
| 5,066,103 | 11/1991 | Kodaka et al. | 359/823 |
| 5,216,549 | 6/1993 | Notagashira et al. | 359/703 |
| 5,255,124 | 10/1993 | Iwamura | 359/704 |
| 5,666,565 | 9/1997 | Wakabayashi et al. | 359/699 |

FOREIGN PATENT DOCUMENTS 0208613  8/1990  Japan ................................. 359/700

*Primary Examiner*—Cassandra Spyrou
*Assistant Examiner*—John Juba, Jr.

[57] ABSTRACT

A lens barrel having a resin cylindrical cam with spiral cam slots extending over an area range as wide as possible, and preferably more than 90°, which enables improvement of the formability of the spiral cam slots on the cylindrical cam, The cylindrical cam with spiral cam slots moves a photographing lens system forward and backward in a direction along the optical axis. The spiral cam slot includes a plural number of areas divided around the axis of the cylindrical cam, and in each of the cam areas the spiral cam slot has a cam surface and a surface opposite to the cam surface. The cain surface is formed at one side of a section of the spiral cam slot taken along a plane containing a normal line to the axis of the cylindrical cam and orthogonal to the locus along the cam slot. The opposite surface is formed at the other side of the section of the spiral cam slot and is inclined to the cam surface providing that these opposite surfaces in adjacent areas be inclined in opposite directions to each other. Each adjoining part between cam areas includes a first border portion in which the inclined surface is formed by a surface approximately parallel to the cam surface, or a second border portion in which the inclined surface is formed by two oppositely inclined adjacent surfaces, the first and second border portions being disposed alternately in the plural number of cam areas

4 Claims, 7 Drawing Sheets

LENS BARREL

This application is a continuation of application Ser. No. 08/475,336, filed Jun. 7, 1995, now abandoned; which is a continuation of application Ser. No. 08/222,361, filed Apr. 4, 1994, now abandoned which is a continuation of application Ser. No. 08/021,012, filed Feb. 22, 1993, now abandoned.

BACKGROUND OF THE INVENTION

1. Field of the Invention

The present invention relates to a lens barrel comprising a cylindrical cam provided with a spiral cam slot for moving a photographing lens system in focusing mode or in zooming mode.

2. Related Background Art

The above-mentioned type of the lens barrel generally contains two or more photographing lens systems disposed therein and performs focusing or zooming by changing the distance between the lens systems.

In the construction for focusing or zooming hitherto generally known, the lens barrel comprises a guide tube in which a member for holding the photographing lens system, for example, a lens frame is mounted. On a part of the guide tube there is formed a linear slot in which a cam pin is engaged. Through the cam pin, the lens frame is supported for movement along the optical axis. Rotatably relative to the guide tube, there is mounted a cylindrical tube on which a spiral cam slot is formed. The spiral cam slot extends circumferentially and inclined to the optical axis. The above-mentioned cam pin is engaged in the spiral cam slot. With the rotation of the cylindrical cam, a force intending to move the lens system forwardly and backwardly in the direction along the optical axis can be transmitted to the lens frame through the cam pin.

The spiral cam slot on the cylindrical cam plays an important role regarding the function to give a lift to the lens system in the direction along the optical axis. For the prior art cylindrical cams made of resin by molding, various methods have been employed to form such spiral cam slot on the cylindrical cam. Some examples thereof are shown in FIGS. 8 through 10(B).

In the example shown in FIG. 8, the cylindrical cam 1 has a cam 2 formed by single surface only.

In another example shown in FIGS. 9(A) through 9(E), the spiral cam slot has two side surfaces. One of the two side surfaces is formed by a surface perpendicular to the axis of the cylindrical tube and the other is formed by a surface so inclined as to widen the slot toward the open side.

In a further example shown in FIGS. 10(A) and 10(B), a spiral cam slot 2 is formed on the inside surface of the cylindrical cam 1. The cross-section of the cam slot has a V-form. Engaged in the cam slot is a cam pin 4 which is radially biased by a spring 5 on the side of the lens frame 3.

SUMMARY OF THE INVENTION

However, the prior art cylindrical cams as shown above, involve some problems, in particular, in connection with the forming of the spiral cam slot 2 on the cylindrical cam 1 made of resin by molding.

For example, in the case of the prior art construction as shown in FIG. 8, it is impossible to form any through-slot in the cylindrical cam. Therefore, it is not suitable for the lens barrel of the type in which the element to be moved (lens system) is received in the cylindrical cam. In addition, if the cam 2 has to be formed extending over a wide circumferential area range more than 180° in order to ensure the necessary amount of rotation of the cylindrical cam 1, it is impossible to form two or more cams 2 simultaneously. Therefore, this example of the prior art construction has a difficulty in attaining the purpose of the smooth guidance of the lens system.

The prior art construction as shown in FIGS. 9(A) through 9(E) has also the disadvantage that the range of the extension of the cam slot 2 is limited within a narrow range in view of molding and it is impossible to form the cam slot 2 extending over the rotational range more than 90°.

The last-mentioned prior art construction as shown in FIGS. 10(A) and 10(B) has the drawback that it needs a complicated structure and high manufacturing cost. The cam slot 2 of this prior art cylindrical cam has a V-shaped section. Therefore, the cam pin 4 to be engaged in the V-shaped cam slot 2 is needed to be a conical pin. To obtain an exact amount of cam lift, there is required a biasing force intending to push the cam pin 4 against the cam surface thereby removing undesirable gap between the V-shaped cam slot 2 and the conical cam follower 4. Thus, additional members such as the spring 5 are needed, which leads to complicated construction and cost-up. In the art, therefore, many attempts are being made to solve these problems involved in the prior art.

Accordingly, it is an object of the present invention to provide a lens barrel made of resin and comprising a cylindrical cam having spiral cam slots formed thereon in a simple manner with improved formability.

Another object of the invention is to provide a lens barrel having such spiral cam slots each of which can be formed extending a wide circumferential area range more than 90°.

A further object of the invention is to provide a cylindrical cam provided with spiral cam slots which is resistable against deformation.

It is a further object of the invention to make the cylindrical cam resistable against deformation by forming the spiral cam slots in such manner that the cam slots are distributed about the axis of the cylindrical cam and one side surface of each slot as viewed in the same direction as the axial direction is formed by a surface parallel to the perpendicular to the axis of the cylindrical cam.

In order to attain the above and other objects, the present invention provides a lens barrel comprising a resin cylindrical cam provided with a spiral cam slot for moving a photographing lens system forward and backward in the direction along the optical axis, which is characterized in that the spiral cam slot is composed of a plural number of areas divided around the axis of the cylindrical cam, and that in each of said cam areas, the spiral cam slot has a cam surface and a surface opposite to the cam surface, said cam surface being formed at one side of a section of the spiral cam slot taken along a plane containing a normal line to the axis of the cylindrical cam and orthogonal to the locus along the cam slot and said opposite surface being formed at the other side of said section and inclined to said cam surface providing that these opposite surfaces in adjacent areas be inclined in opposite directions to each other, and that every adjoining part between cam areas includes a first border portion in which said inclined surface is formed by a surface approximately parallel to said cam surface, or a second border portion in which said inclined surface is formed by two oppositely inclined adjacent surfaces, said first and second border portions being disposed alternately in said plural number of cam areas.

The present invention provides also a lens barrel mentioned above which is further characterized in that among said plural number of cam areas constituting the spiral cam slot, those areas in which said inclined surface on the other side is so inclined as to inwardly widen the slot, are formed by groove portions recessed from the inside surface of the cylindrical cam.

According to the invention, by combining together a plural number of divided areas, the spiral cam slots can be formed extending continuously over a wide area range more than 90° on a cylindrical cam. Furthermore, it is possible to moderate the inclination of the spiral cam slot to the optical axis when the amount of movement of the lens system is the same as that in the prior art one. Therefore, the turning force of the cylindrical cam required for moving the lens system can be decreased accordingly. As the result, the driving torque for rotating the cylindrical cam can be reduced substantially.

Further, since one side surface of the cam slot extending over the area more than 90° is formed by a surface extending parallel to the perpendicular to the axis of the cam surface, a straight pin can be used as the cam follower (14 in FIG. 4). This makes it possible to exactly transmit the cam lift to the lens system even if there is any play of the pin in the slot in the direction of the plane extending perpendicularly to the optical axis of the lens system in the lens barrel.

These objects and advantages of this invention will become more apparent from the following description taken in connection with the accompanying drawings.

BRIEF DESCRIPTION OF THE DRAWINGS

FIGS. 9(A), 9(B), 9(C), 9(D) and 9(E) are schematic views illustrating another example of the spiral cam slot formed on the cylindrical cam of the prior art lens barrel, of which:

FIG. 9(A) is a schematic elevation thereof,

FIG. 9(B) is a section thereof taken along the line B—B;

FIGS. 9(C), 9(D) and 9(E) are sections thereof taken along the lines C—C, D—D and E—E, respectively; and FIGS. 10(A) and 10(B) illustrate a further example of the spiral cam slot formed on the cylindrical cam of the prior art lens barrel, of which:

FIG. 10(A) is a schematic elevation thereof, and

FIG. 10(B) is a section of the essential part thereof.

DETAILED DESCRIPTION OF THE PREFERRED EMBODIMENTS

A preferred embodiment of the lens barrel according to the invention is shown in FIGS. 1 through 4.

Figure 4:
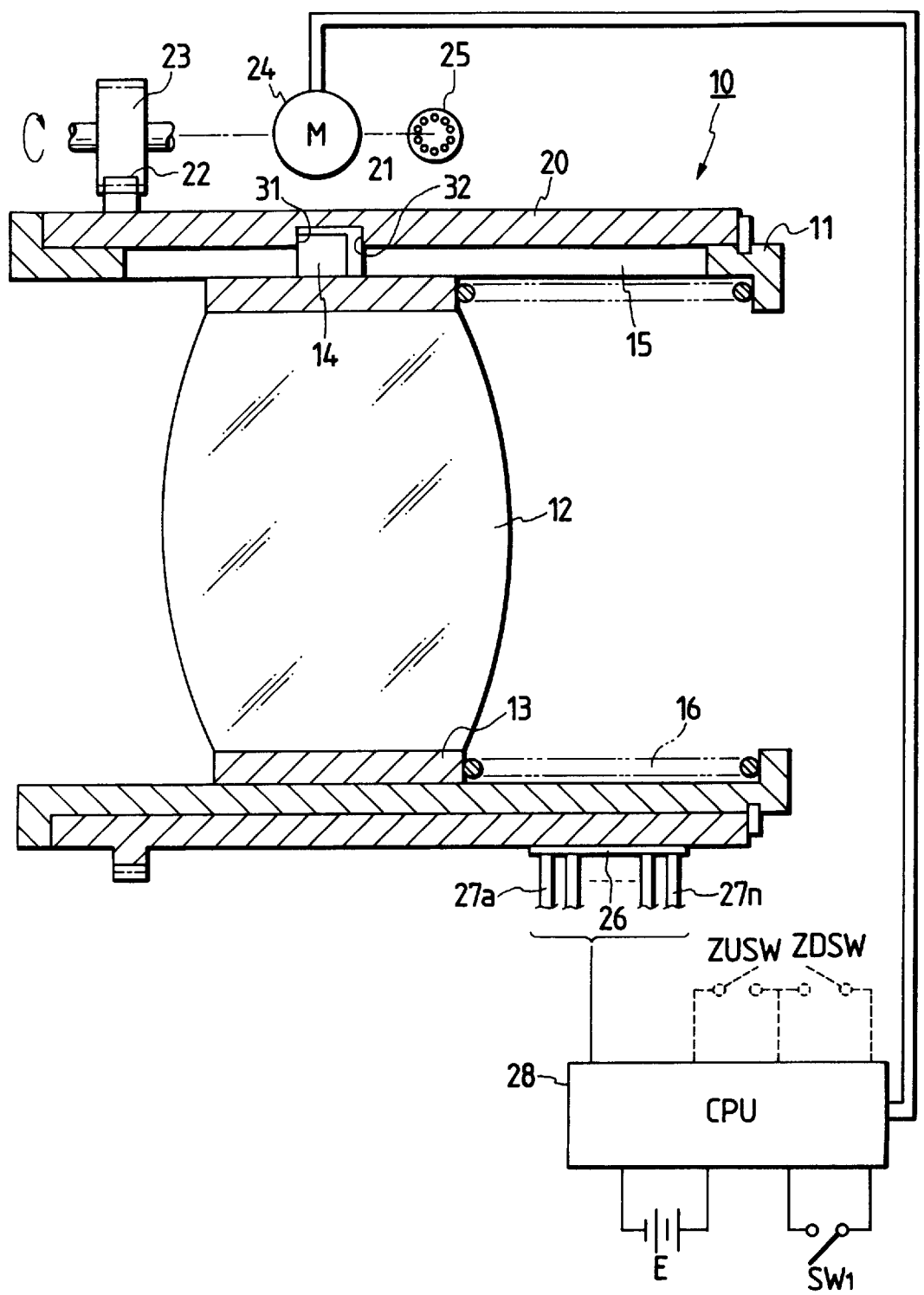
FIG. 4 is a schematic illustration showing the arrangement of the essential members of the lens barrel according to the invention.

The lens barrel is generally denoted by 10. The essential parts and members of the lens barrel are schematically shown in FIG. 4. At first, the construction of the lens barrel according to the invention will be described in detail with reference to FIG. 4.

Designated by 11 is a guide tube stationarily mounted on a part of the camera body (not shown). Within the guide tube 11 a photographing lens system 12 is supported by a lens frame 13 which is in turn supported through the guide tube for advance and retreat movement so that the lens system 12 can be moved forwards and backwards in the direction along the optical axis for focusing or zooming.

The lens frame 13 has three projecting cam pins 14 (only one of which is seen in FIG. 4). The three cam pins are disposed at equal angular intervals along the circumference of the lens frame 13. The cam pins 14 are engaged in a linear guide slot 15 formed in the guide tube 11. Through the pin-slot engagement, the lens frame 13 is guided always in the direction along the optical axis.

Within the guide tube 11, the lens frame 13 is biased by a spring 16 which intends to move the lens frame always leftwards along the optical axis as viewed in FIG. 4.

Designated by 20 is a cylindrical cam supported on the outer circumference of the guide tube 11 for rotation. As clearly seen from FIG. 1, the cylindrical cam 20 has three spiral cam slots 21 formed on the cylindrical portion of the cam. On the circumference of the cylindrical cam, the three spiral slots 21 are inclined toward the optical axis and are disposed corresponding to the above-mentioned three cam pins 14. These cam slots have the same form and are disposed rotation-symmetrically each other about the rotation axis of the cylindrical cam 20, that is, about the optical axis.

The above-mentioned cam pins 14 projecting from the lens frame 13 are engaged in these spiral cam slots 21 through the linear guide slot 15 formed on the guide tube 11 so that the lens system 12 can be moved forward or backward in the direction along the optical axis by rotating the cylindrical cam 20.

As shown in FIG. 4, the cylindrical cam 20 is driven for rotation by a driving motor 24 through gears 22 and 23. 22 is the gear formed on a portion of the outer circumference of the cylindrical cam 20. 23 is the driven gear in mesh with the gear 22. When the gear 23 is driven by the motor 24, the cylindrical cam 20 is rotated to move the photographing lens system 12. The amount of the motor drive is detected by a drive pulse detector 25.

In order to detect the rotational position of the cylindrical cam 20 and therefore the position of the lens system 12 on the optical axis, there is provided an encoder comprising an encoder base plate 26 and an encoder brush 27a, 27b, . . . 27n. The encoder base plate 26 is fixedly wound on the circumferential surface of the cylindrical cam 20 and has a contact pattern formed on the plate. The encoder brush is in contact with the base plate to take out a signal from the contact pattern. The signal is introduced into a CPU 28 from the position detector to control the driving of the motor 24. The CPU 28 also has an input of detection signal from the drive pulse detector 25 so that a feedback control can be performed by it.

In FIG. 4, the reference character E denotes a battery and SW1 does a start switch such as release switch.

ZUSW is a zoom-up switch and ZDSW is a zoom-down switch. These two switches are suggested by broken lines in FIG. 4 and used only when the present lens tube 10 is used as a zooming lens.

The particular feature of the lens tube 10 described above resides in the form and arrangement of the spiral cam slots 21, which will be understood from the following description with reference to FIGS. 1 through 3(D). According to the present invention, each of the spiral cam slots 21 can be formed extending over a wide range more than 90° on the periphery of the cylindrical cam 20 by resin molding.

Figure 1:
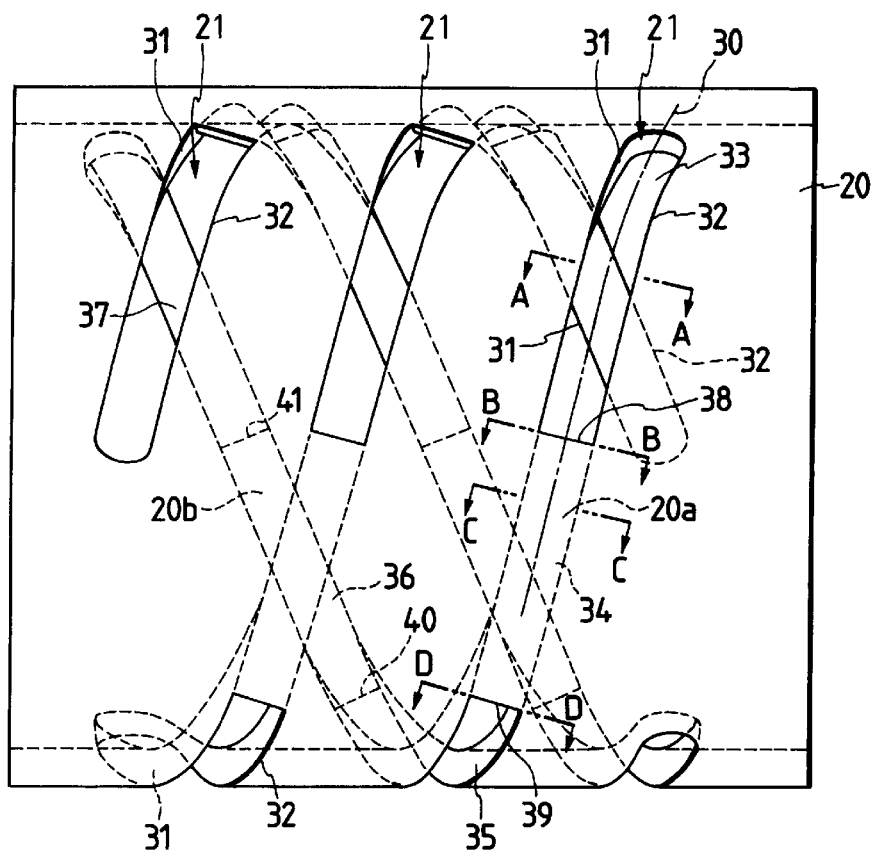
FIG. 1 is a schematic side view of a cylindrical cam having spiral cam slots formed thereon, showing the essential part of an embodiment of the lens barrel according to the present invention.

Although the cylindrical cam 20 has three spiral cam slots 21 on it as shown in FIG. 1, we will hereinafter describe the form and function of the cam slots in connection with the most-right hand one 21 only because, as previously mentioned, the three spiral slots are all the same in form and function.

In FIG. 1, the reference numeral 30 denotes the center line of the spiral cam slot 21. Along the slot center line 30, the center of the cam pin 14 moves. The cam pin 14 may be, for example, a cylinder cam follower whose rotation axis is orthogonal to the rotation axis of the cylindrical cam 20 (optical axis). The reference numeral 31 denotes a cam surface which the cam pin 14 contacts with and the locus of its tangential defines.

Designated by 32 is a surface opposite to the cam surface 31. The space between the two surfaces 31 and 32 is so measured as to be sufficient for receiving the cam pin 14. As will be described later, the surfaces have particular sectional forms determined by the forms of the metal molds used for forming the slots.

Figure 2:
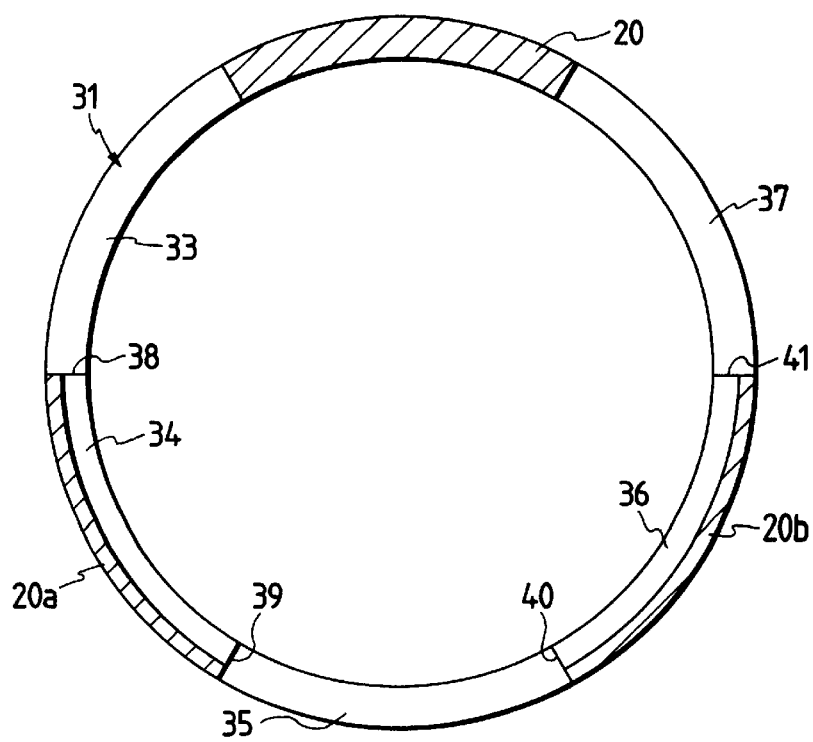
FIG. 2 is a sectional view of the essential part of the embodiment taken along the spiral cam slot shown in FIG. 1.

FIG. 2 is a sectional view of the cam surface 31 of the cylindrical cam 20 taken along the center line 30 of the spiral cam slot 21. As clearly seen from FIG. 2, the cam surface 31 is composed of five peripherally divided areas (first area to fifth area) 33 to 37 by molding. The adjoining portions 38 to 41 of these five areas 33 to 37 have parting lines produced by molding as the result of molds united together. The parting lines appear as stripe-like projections.

In the areas 34 and 36 there are thin wall bridging portions 20a and 20b of the cylindrical cam 20. The cam slot portions in the two areas 34 and 36 are formed as recessed slot portions from the inside of the cylindrical cam 20. In other three areas 33, 35 and 37, the cam slot portions are formed as pass-through slot. The function of the bridging portions 20a and 20b is to prevent the cylindrical cam 20 from being deformed by axial expansion. When the spiral cam slot 21 is formed extending over the area range more than 180°, an axially acting force is applied to the cylindrical cam 20, which may otherwise cause any deformation by axial expansion.

FIGS. 3(A), 3(B), 3(C) and 3(D) are sectional views of the spiral cam slot 21 as viewed when the cam slot 21 is cut by a plane orthogonal to the slot center line 30 at the point of intersection with the center line 30. As clearly seen from these figures, in the first area 33, the surface 32 opposite to the cam surface 31 is inclined outwardly to provide an inclined surface 32a. The cam surface 32 facing the cam surface 31 in the first area 33 and a second area 34 is formed as inclined surfaces 32a and 32b, respectively, directed inside of and outside of the cylindrical cam 20. Directions of inclination of the surfaces 32a and 32b in the first area 33 and the second area 34, adjacent thereto, are inverse to each other.

Figure 3A:
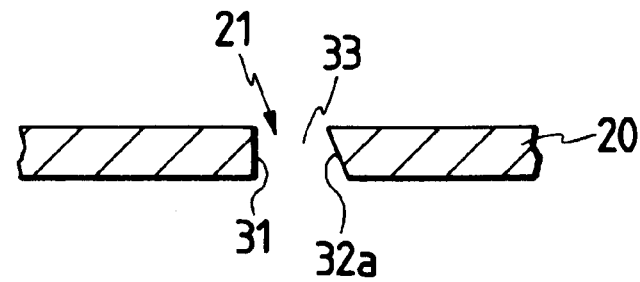
FIGS. 3(A), 3(B), 3(C) and 3(D) are sectional views of the essential part taken along the lines A—A, B—B, C—C and D—D in FIG. 1, respectively.
Figure 3B:
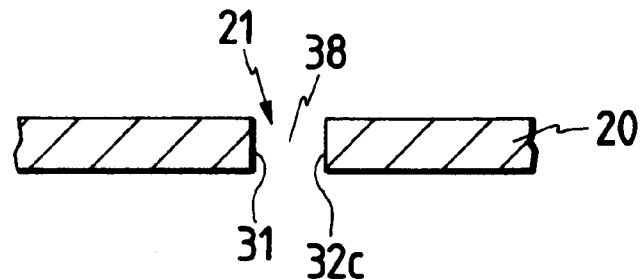
Figure 3C:
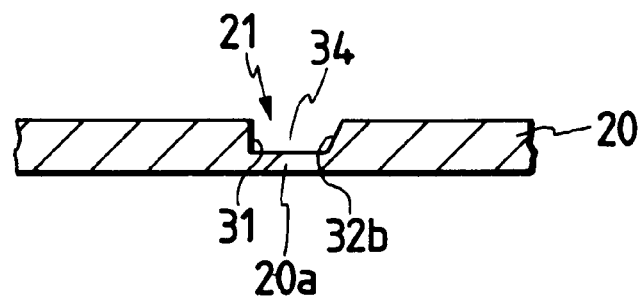
Figure 3D:
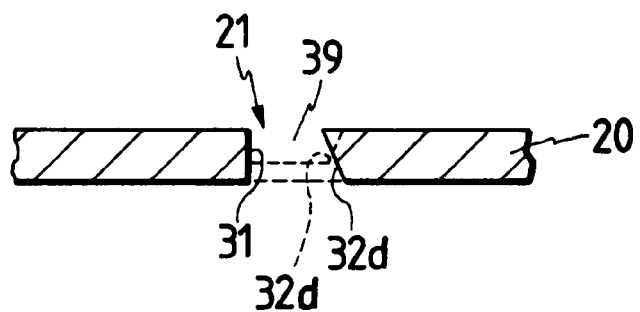

Each two neighboring areas, for example, 33 and 34, 35 and 36, are paired. In the adjoining portion between the paired two areas, for example, in the adjoining portion 38 between the paired areas 33 and 34, or in the adjoining portion 40 between the paired areas 35 and 36, the surface 32c opposite to the cam surface 31 is not inclined, but parallel to the cam surface 31 as seen in FIG. 3(B). In contrast, the adjoining portion between two pairs, for example, the adjoining portion 39 or 41, the surface 32d opposite to the cam surface 31 is a combination of surfaces inclined inwards and outwards alternately as seen in FIG. 3(D).

Since the spiral cam slot 21 is designed in the manner as described above, the spiral cam slots in the present embodiment, for example, the spiral cam slot 21 composed of the first, second and third areas 31, 32 and 33 can be formed by suitably designing the molds of the first, second and third areas 31, 32 and 33 for the cam slot. Thus, it is possible to form the spiral cam slot 21 extending over the area range more than 90° on the peripheral surface of the cylindrical cam 20 by molding using the particularly designed molds together.

The lens barrel with the cam slot described above has remarkable advantages over the prior art. Even if the amount of the movement of the photographing lens system 12 is equal to that in the prior art structure, the present invention enables to moderate the inclination of the spiral cam slot 21 to the optical axis. Therefore, the turning force of the cylindrical cam 20 required for moving the lens system 20 can be reduced. Consequently, the driving torque of the motor 24 for rotating the cylindrical cam 20 can be reduced accordingly. It leads to a substantial cost reduction by using a smaller motor.

The manner of control operation for focusing or zooming with the lens barrel 10 according to the invention will be described with reference to FIGS. 5, 6 and 7.

Figure 5:
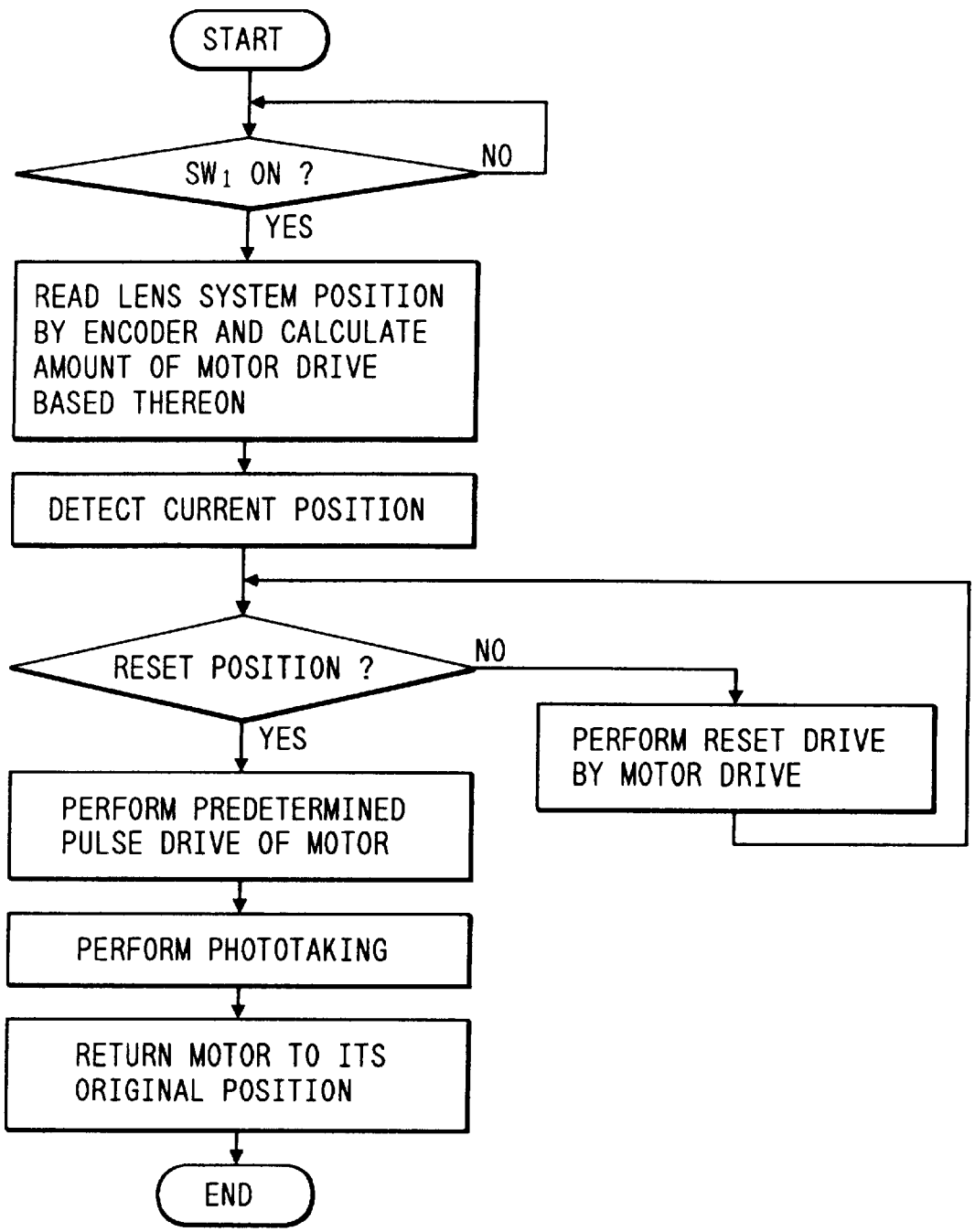
FIG. 5 is a flow chart of a control operation for focusing by the lens barrel according to the invention.

FIG. 5 is a flow chart of control for focusing with the lens barrel 10 according to the invention, for example, as shown in FIG. 4. When the release switch SW1 is switched ON, its ON signal is introduced into the CPU 28. In response to the signal, the CPU 28 reads the position of the lens system 12 by the encoder (26, 27) by detecting the position of the cam pin 14 in the spiral cam slot 21 on the cylindrical cam 20. Based on the detected lens position, the necessary amount of motor drive is calculated. Then the current position is detected and it is judged whether it is the reset position (original position) or not. When it is not the reset position, the CPU 28 performs a reset drive by the motor. Thereafter, it performs a predetermined pulse drive of the motor relying upon the information from the distance measuring means (not shown). Thus, a phototaking is performed. Completing the phototaking, the motor 24 is returned to its original position.

Figure 6:
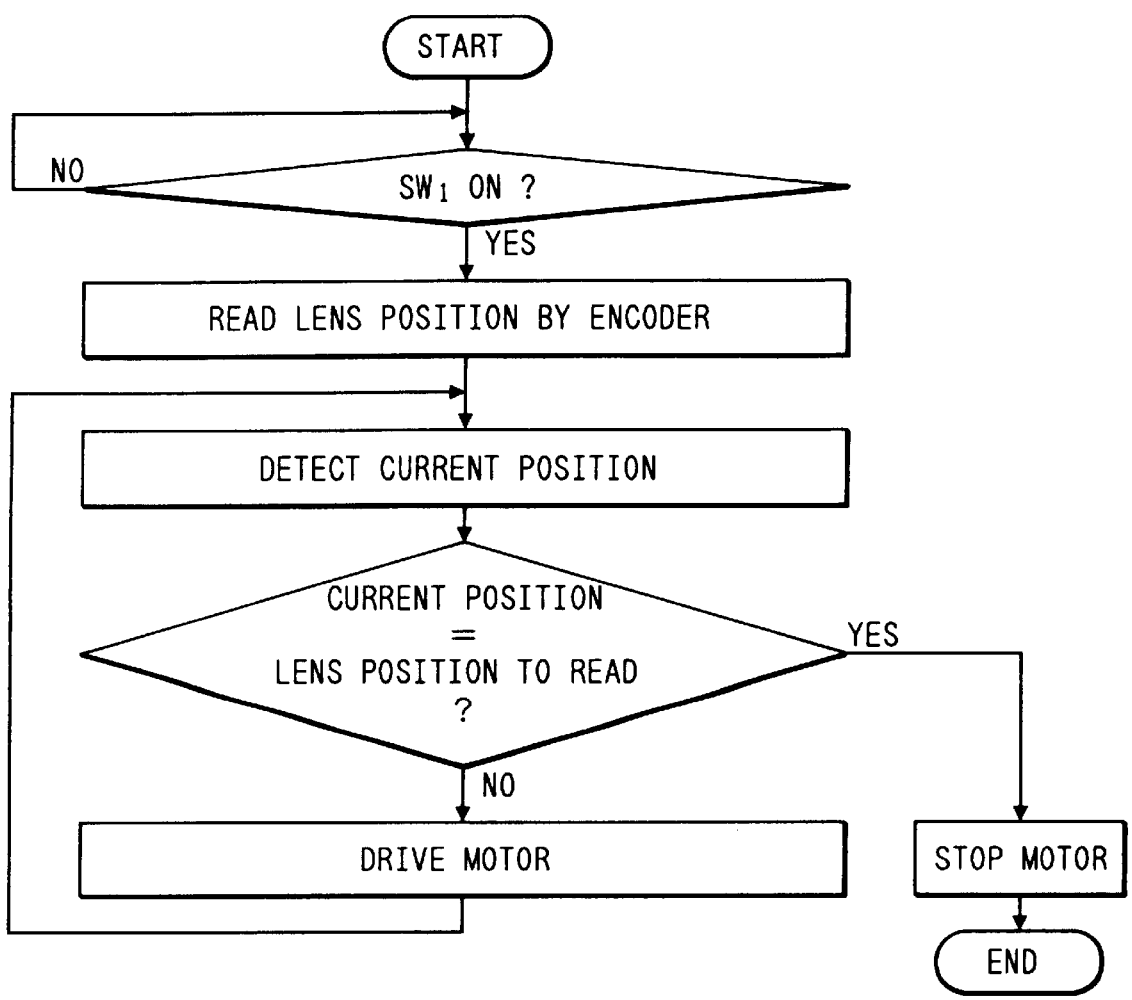
FIG. 6 is a flow chart of another control operation for focusing by the lens barrel according to the invention.

FIG. 6 is a flow chart similar to FIG. 5. Although FIG. 5 shows the case where the motor 24 is driven from its original position for focusing, FIG. 6 relates to another case where the motor is driven from the current position for focusing.

Referring to FIG. 6, after the release switch SW1 is switched ON, the position of the lens system 12 is read out by the encoder and then the position of the motor 24 is detected. From the detected position to a determined focusing position, the motor is driven and stopped to perform a phototaking.

Figure 7:
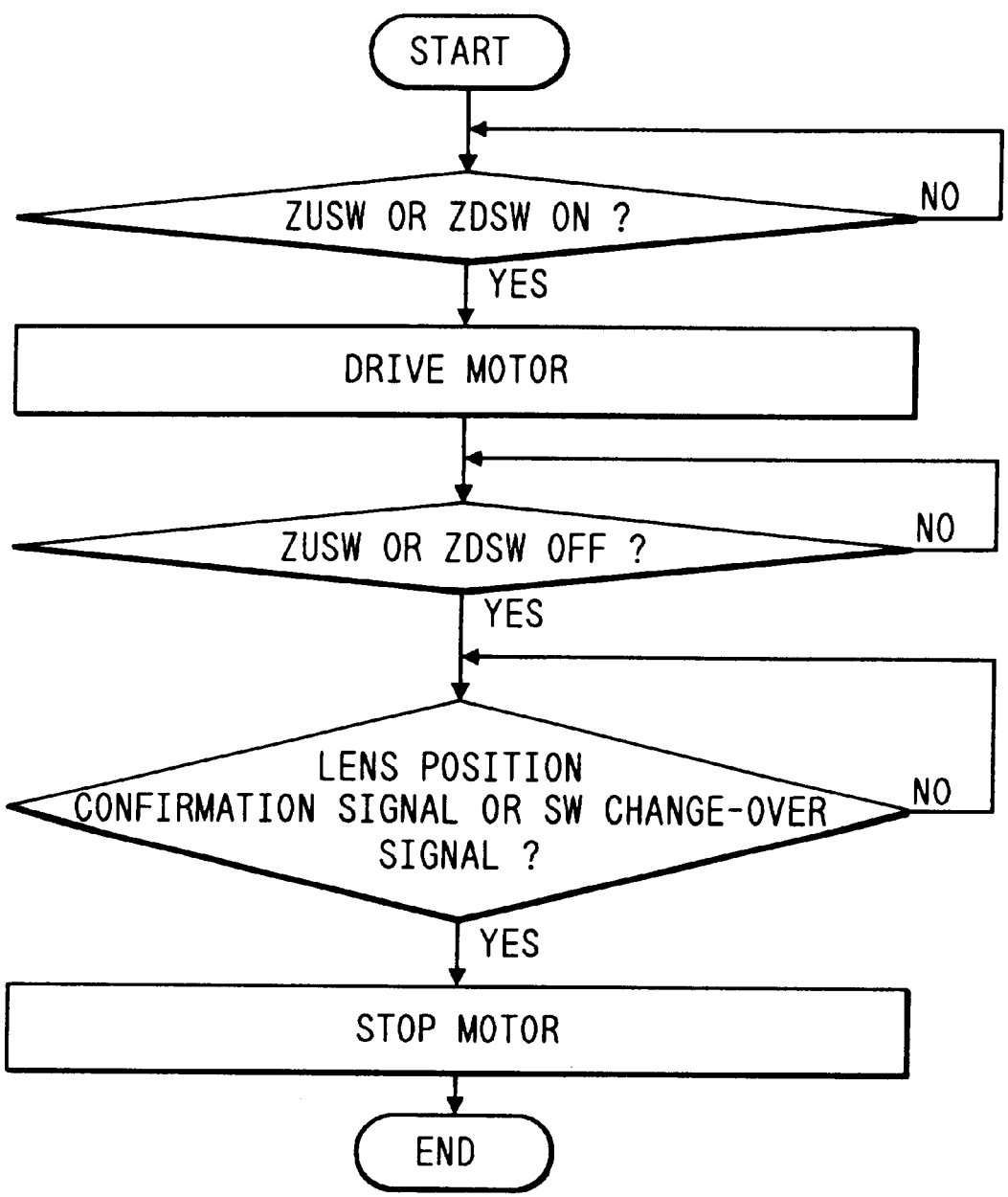
FIG. 7 is a flow chart of a control operation for zooming by the lens barrel according to the invention.
Figure 8:
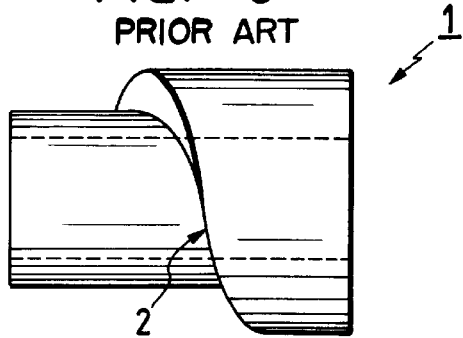
FIG. 8 is a schematic view illustrating an example of the spiral cam slot formed on the cylindrical cam of the prior art lens barrel.
Figure 9A:
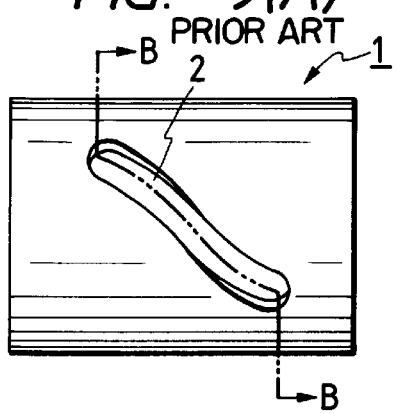
Figure 9B:
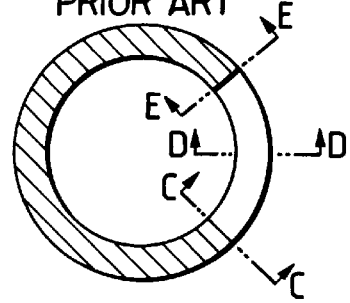
Figure 9C:
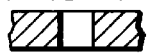
Figure 9D:
Figure 9E:
Figure 10A:
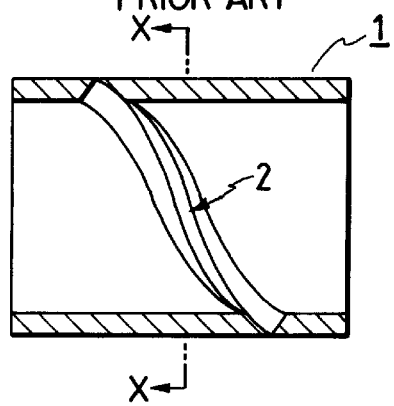
Figure 10B:
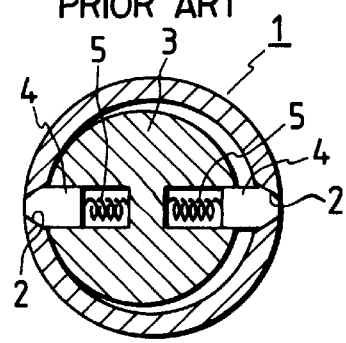

FIG. 7 is a flow chart of control operation for zooming the lens barrel 10.

When the zoom-up switch ZUSW or the zoom-down switch ZDSW is ON, the motor 24 is driven. When the switch is turned OFF, the lens position is detected by the encoder (26, 27) and it is verified whether the lens system has been moved to the predetermined position or the switch SW has been changed over. Thereafter, the motor 24 is stopped in response to a signal from the CPU 28.

It is to be understood that the present invention is not limited to the preferred embodiment particularly shown and described above, but various changes and modifications in form and arrangement are possible within the scope of the invention. For example, the parts and members of the lens barrel 10 may be otherwise variously embodied.

As previously described, the lens barrel according to the invention comprises a cylindrical cam made of resin provided with spiral cam slot for moving a photographing optical system forwardly and backwardly in the direction along the optical axis and is characterized in that the spiral cam slot is composed of a plural number of areas divided around the axis of the cylindrical cam and that in each of said cam areas, the spiral cam slot has a cam surface and a surface opposite to the cam surface, said cam surface being formed at one side of a section of the spiral cam slot taken along a plane containing a normal line to the axis of the cylindrical cam and orthogonal to the locus along the cam slot and said opposite surface being formed at the other side of said section and inclined to said cam surface providing that these opposite surfaces in adjacent areas be inclined in opposite directions to each other, and that every adjoining part between cam areas includes a first border portion in which said inclined surface is formed by a surface approximately parallel to said cam surface, or a second border portion in which said inclined surface is formed by two oppositely inclined adjacent surfaces, said first and second border portions being disposed alternately in said plural number of cam areas.

The features of the lens barrel according to the invention bring forth the following advantages:

Firstly, since the spiral cam slot is simple in structure and has, at least at one side thereof, a cam surface formed by a surface parallel to the perpendicular to the optical axis, such spiral cam slot continuously extending over the area range more than 90° can be formed in a simple manner by molding using a set of divided areas together.

Secondly, it is possible to moderate the inclination of the spiral cam slot to the optical axis even when the phototaking lens system is to be moved in the same amount of movement as that required in the prior art one. Therefore, the turning force of the cylindrical cam required for focusing or zooming the lens system can be reduced. Consequently, the driving torque for rotating the cylindrical cam can be decreased accordingly. It leads to a substantial cost reduction by using a smaller motor.

Finally, it is allowed to form on the cylindrical cam a plural number of such spiral cam slots in which a cylindrical cam pin can be used and the slot can be rotated over the range more than 90°. As the result, the lens system can be guided as required in the direction along the optical axis with very high reliability.

In a preferred embodiment of the present invention, among the plural number of cam areas constituting the spiral cam slot, those areas in which said inclined surface on the other side is so inclined as to inwardly open, are formed by groove portions recessed from the inside surface of the cylindrical cam. This feature brings forth a further advantage that the resistance against any axial acting force which may cause deformations of the cylindrical cam can be improved remarkably. Thus, the present invention provides also a simple way to obtain a light-weight resin cylindrical cam which has high strength and is very resistable against deformation.

What is claimed is:

1. A lens device, comprising:

a lens;

a lens frame holding the lens, the lens frame including a cam follower pin to receive a force to move along an optical axis;

a cylindrical cam surrounding the lens and the lens frame, the cylindrical cam comprising a cam groove including a first cam surface and a second cam surface opposed to the first cam surface which abut against the cam follower pin to move the lens frame along the optical axis by rotation of the cylindrical cam with respect to the optical axis, wherein the respective first and second cam surfaces are divided into a plurality of surfaces, and a parting line is formed at a location where the respective first and second cam surfaces are divided, the parting line extending between the opposed cam surfaces, and each of the plurality of divided first cam surfaces have a same angle of inclination, the plurality of divided second cam surfaces comprise a first divided second cam surface having an angle of inclination away from the first cam surface, a second divided second cam surface having an angle of inclination toward the first cam surface, and a portion of the second cam surface joining the first divided second cam surface and the second divided second cam surface is not inclined with respect to the first cam surface.

2. A cylindrical cam according to claim 1, wherein the first and second cam surfaces are formed by a through hole portion and a groove in an inner diameter side of the cylindrical cam.

3. A lens device, comprising:

a lens;

a lens frame holding the lens, the lens frame including a cam follower pin to receive a force to move along an optical axis; and a cylindrical cam surrounding the lens and the lens frame, the cylindrical cam comprising cam surfaces which are opposed to each other and which abut against the cam follower pin to move the lens frame along the optical axis by rotation of the cylindrical cam with respect to the optical axis, wherein the respective cam surfaces are divided into a plurality of surfaces, and a parting line is formed at a location where the cam surfaces are divided, the parting line extending between the opposed cam surfaces, and the plurality of surfaces of one of the cam surfaces comprises a first surface which flares inwardly and a second surface which flares outwardly, the first surface being adjacent to the second surface, and the parting line of the first surface and the second surface is inclined with respect to a longitudinal direction of the cam cylinder.

4. A cylindrical cam according to claim 3, wherein the cam surfaces are formed by a through hole portion and a groove in an inner diameter side of the cylindrical cam.

* * * * *